United States Patent

Walsh

[11] Patent Number: 4,604,330
[45] Date of Patent: Aug. 5, 1986

[54] FUEL CELL ELECTROLYTE

[75] Inventor: Edward N. Walsh, New City, N.Y.

[73] Assignee: Stauffer Chemical Company, Westport, Conn.

[21] Appl. No.: 562,319

[22] Filed: Dec. 16, 1983

[51] Int. Cl.$^4$ .............................................. H01M 8/08
[52] U.S. Cl. ......................................... 429/13; 429/46
[58] Field of Search .................. 429/13, 46, 188, 198, 429/203, 29

[56] References Cited

U.S. PATENT DOCUMENTS

| | | | |
|---|---|---|---|
| 3,375,138 | 3/1968 | Mather, Jr. | 429/46 |
| 3,719,528 | 3/1973 | Grasselli et al. | 429/46 |
| 4,252,868 | 2/1981 | Böhm et al. | 429/46 |

OTHER PUBLICATIONS

Kunz et al, Optimization of Carbon-Supported Platinum Catalysts to Fuel Cell Electrodes, United Technologies Corp., Final Tech. Rept., Oct. 1979–Oct. 1980, apparent pub. date Dec. 1980.

Walsh et al, Electrolytes for Hydrocarbon Air Fuel Cells, ECO, Inc., Interim Technical Rept., apparent pub. date Apr. 1980.

Primary Examiner—Donald L. Walton
Attorney, Agent, or Firm—Hensley M. Flash

[57] ABSTRACT

This invention relates to a novel intermediate temperature fuel cell electrolyte, fuel cells containing this electrolyte and a process for operating these fuel cells.

The fuel cell electrolyte composition comprises one or more phosphonic acids. Typical phosphonic acids are compounds of the formula

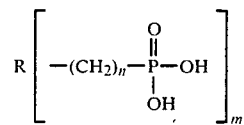

wherein R is a moiety derived from hydroxyalkyl, alkyl, phenyl, alkylphenyl, vinyl, haloalkyl, halophenyl, halomethylphenyl, vinyl, amine, ammonia and

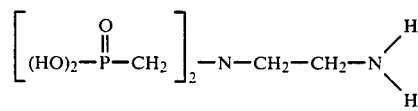

and m represents an integer from 1 to 3 and n represents 0 (zero) or the integer 1. This electrolyte composition can further comprise phosphoric acid.

The fuel cell electrolyte composition can include a gelling agent and can be effectively used in fuel cells wherein the fuel is hydrogen, the oxidizer is oxygen and the operating temperature is between about 100° C. and 250° C.

24 Claims, No Drawings

FUEL CELL ELECTROLYTE

BACKGROUND OF THE INVENTION

1. Field of the Invention

This invention relates to novel intermediate temperature fuel cell electrolytes, fuel cells containing these electrolytes and a process for operating these fuel cells. More particularly, the invention relates to electrolyte compositions containing one or more phosphonic acids and the use thereof in fuel cells.

2. Related Art

Fuel cells are well known electrochemical devices for converting chemical energy directly into electrical energy without the intermediate thermal energy stage typical in the conventional power plant method of generating electricity. In a fuel cell, a gaseous fuel is oxidized by an oxygen containing gas to produce electricity directly. The typical cell has two electrodes immersed into and separated by an electrolyte. These electrodes are externally connected to an electrical load, e.g., an electric motor.

Fuel cells have been broadly classified into three general types. The first type is the high temperature fuel cell which operates at temperatures of greater than about 600° C. The second type is the low temperature fuel cell which operates at temperatures of less than about 100° C. The third type is the intermediate temperature fuel cell which operates at temperatures of between about 100° C. and 300° C. This invention relates to these intermediate temperature fuel cells.

These intermediate temperature fuel cells usually contain fluid aqueous electrolytes, e.g., phosphoric acid. However, these fluid electrolytes are prone to cause electrode flooding when porous electrodes are used, and further, the use of high pressures, e.g., of the order of 600 lbs. per square inch (0.4218 Kg/sq. mm) are required to prevent the water in the aqueous electrolyte from evaporating. Electrolytes that provide acceptable conductivity and yet do not volatilize readily from the fuel cell would be advantageous.

U.S. Pat. No. 3,375,138 (W. B. Mather, Jr., Mar. 26, 1968) discloses a borophosphoric acid-phosphoric acid gelled electrolyte for use in an intermediate temperature fuel cell. This patent further discloses a method for preparing this particular electrolyte gel, however, this patent does not disclose or teach electrolyte compositions as disclosed by the present invention.

Electrolytes of acceptable conductivity which do not readily volatilize would be advantageous. Fuel cells containing such electrolytes and a process for operating such fuel cells would also be advantageous.

Other objects and advantages of the present invention are shown throughout this specification.

SUMMARY OF THE INVENTION

In accordance with the present invention, a novel fuel cell electrolyte composition has now been discovered. This fuel cell electrolyte composition comprises one or more phosphonic acids. Typical phosphonic acids are compounds of the formula

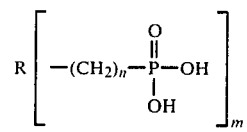

wherein R is a moiety derived from hydroxyalkyl, alkyl, phenyl, alkylphenyl, vinyl, haloalkyl, halophenyl, halomethylphenyl, amine, ammonia and

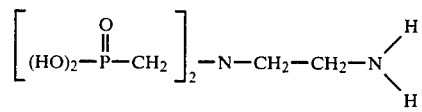

and m represents an integer from 1 to 3 and n represents 0 (zero) or the integer 1. The electrolye composition can further comprise phosphoric acid and/or a gelling agent selected from the group consisting of powdered graphite, boric acid, and/or boronphosphate and matrix materials such as carbon, silicon carbide, silicon nitride, or mixtures thereof.

This invention further comprises a fuel cell for production of electrical energy by the decomposition of a fuel gas and oxidizing gas only containing a fuel cell electrolyte of the composition disclosed above.

This invention even further comprises a process for operating fuel cells containing electrolytes of the composition disclosed above.

DETAILED DESCRIPTION OF THE INVENTION

The present invention comprises a novel fuel cell electrolyte composition. This fuel cell electrolyte composition comprises one or more phosphonic acids. The phosphonic acids capable of being used in this invention represent a wide range of compounds that can, for example, be organo-phosphonic acids, nitrogen containing phosphonic acids, sulfur containing phosphonic acids, etc. Typical phosphonic acids are compounds of the formula

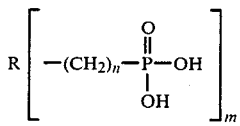

wherein R is a moiety derived from hydroxyalkyl, alkyl, phenyl, alkylphenyl, vinyl, haloalkyl, halophenyl, halomethylphenyl, amine, ammonia and

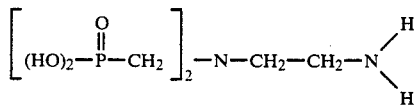

and m represents an integer from 1 to 3 inclusive and n represents 0 (zero) or the interger 1 (one). The R moiety described above is monovalent when m=1, is divalent when m=2, and is trivalent when m=3 for most of the species listed. For example, in the case where the R moiety is derived from hydroxyalkyl the following occurs: when m=1, R is hydroxyalkyl; when m=2, R is hydroxyalkylene; and when m=3, R is substituted hydroxyalkylene. In another example, where the R moiety is derived from phenyl, alkylphenyl, halophenyl or halomethylphenyl the following occurs: when m=1, R is phenyl, alkylphenyl, halophenyl, or halomethylphenyl respectively; when m=2, R can be e.g., a 1,3 substituted phenyl, alkylphenyl, halophenyl or halomethylphenyl respectively; and when m=3, R can be e.g., a 1,3,5 substituted phenyl, alkylphenyl, halophenyl, or halomethylphenyl respectively. In these examples, the substituents are

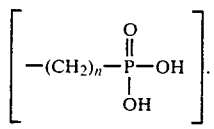

When R is a moiety derived from amine or

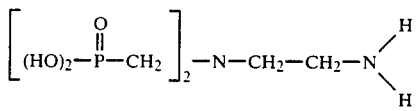

then m cannot be greater than the number of N—H bonds available for substitution.

Other typical phosphonic acids are compounds of the formula

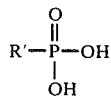

wherein R' is hydroxyalkyl, alkyl, phenyl, alkylphenyl, vinyl, haloalkyl, halophenyl and halomethylphenyl.

The phosphonic acid electrolyte compositions can further comprise phosphoric acid, i.e., $H_3PO_4$.

When R and/or R' are hydroxyalkyl, alkyl, alkylphenyl, and haloalkyl, the alkyl or alkyl component can be $C_1$ to $C_{18}$ with $C_1$ being preferred.

When R and/or R' are haloalkyl, halophenyl and halomethylphenyl, the halogen component can be chloride, fluoride, bromide or iodide. These R and/or R' constituents can be single or multiple substituted with halogens.

R and R' are preferably methylphenyl, phenyl and hydroxymethyl.

The fuel cell electrolyte composition disclosed above can further comprise a gelling agent to form a semi-solid composite. The gelling agent can be selected from the group consisting of powdered graphite, boric acid, and/or boronphosphate and matrix materials such as carbon, silicon carbide, silicon nitride, or mixtures thereof. Some of these gelling agents can form true gels with the phosphonic acid and phosphoric acid components, however, others can only form pastes. The gel or paste formed upon addition of the gelling agent can be formulated to such a consistency that when it is used as an electrolyte it is fluid enough to readily permit current flow via proton transfer yet be immobile enough so that electrode flooding does not occur or is minimized when porous electrodes are used. Additionally, these gels and/or pastes can be relatively less volatile than when no gelling agents are used.

The electrolyte compositions of this invention can be used in a fuel cell for producing electrical energy by the decomposition of a fuel gas and oxidizing gas only. The fuel cells can be operated by feeding the fuel gas to the anode and feeding the oxidizing gas to the cathode. At the anode, the fuel gas is oxidized thereby releasing electrons which are picked up by the anode and carried through the external circuit containing the electrical load device to the cathode. At the cathode these electrons reduce the oxidizing gas and form water with the hydrogen ions supplied by the electrolyte composition.

These fuel cells can be maintained at temperatures of from about 100° C. to about 300° C. with a temperature of from about 100° C. to about 250° C. being preferred. The higher the temperature the more power is supplied by these cells but the greater the volatility of the electrolyte used.

Fuel gases such as hydrogen, gaseous saturated aliphatic hydrocarbons, carbon monoxide, methanol, formaldehyde, formic acid and mixtures thereof can be used in these fuel cells. Gaseous saturated aliphatic hydrocarbons at the cell temperature include, e.g., methane, ethane, propane, butane and pentane. Water is also introduced with the fuel gases to react therewith and produce the hydrogen ions and free electrons.

Oxidizing gases such as pure oxygen or air can be employed in these fuel cells. In a preferred operation of the cell, hydrogen is the fuel and pure oxygen is the oxidizing gas.

The scope of protection sought is set forth in the claims which follow.

What is claimed is:

1. A process for making a fuel cell comprising using one or more phosphonic acids of the formula

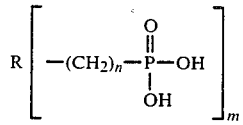

wherein m represents an integer from 1 to 3, n represents 0 or the integer 1, and R is a moiety derived from hydroxyalkyl, alkyl, phenyl, alkylphenyl, vinyl, halophenyl, halomethylphenyl, amine, ammonia and

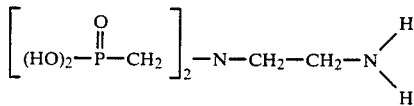

as an electrolyte composition.

2. The process of claim 1 wherein the electrolyte composition used further comprises phosphoric acid.

3. A process for making a fuel cell comprising using one or more phosphonic acids of the formula

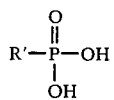

wherein R' is hydroxyalkyl, alkyl, phenyl, alkylphenyl, vinyl, haloalkyl, halophenyl and halomethylphenyl as an electrolyte composition.

4. The process of claim 3 wherein the electrolyte composition used further comprises phosphoric acid.

5. The process of claim 4 wherein R' is methyl.

6. The process of claim 4 wherein R' is methylphenyl.

7. The process of claim 4 wherein R' is hydroxymethyl.

8. The process of claim 4 wherein R' is phenyl.

9. The process of claim 4 wherein the electrolyte composition used further comprises a gelling agent.

10. The process of claim 9 wherein the gelling agent is selected from the group consisting of powdered graphite, boric acid, boronphosphate or mixtures thereof.

11. The process of claim 3 wherein R' is methyl.

12. The process of claim 3 wherein R' is methylphenyl.

13. The process of claim 3 wherein R' is hydroxymethyl.

14. The process of claim 3 wherein R' is phenyl.

15. The process of claim 3 wherein the electrolyte composition used further comprises a gelling agent.

16. The process of claim 15 wherein the gelling agent is selected from the group consisting of powdered graphite, boric acid, boronphosphate or mixtures thereof.

17. A process for making a fuel cell which produces electrical energy by the decomposition of a fuel gas and oxidizing gas only comprising using one or more phosphonic acids of the formula

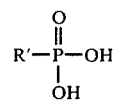

wherein R' is hydroxyalkyl, alkyl, phenyl, alkylphenyl, vinyl, haloalkyl, halophenyl and halomethylphenyl as a fuel cell electrolyte in said fuel cell.

18. The process of claim 17 wherein the electrolyte used further comprises phosphoric acid.

19. The process of claim 17 wherein the electrolyte used further comprises a gelling agent.

20. The process of claim 19 wherein the gelling agent is selected from the group consisting of powdered graphite, boric acid, boronphosphate or mixtures thereof.

21. The process of claim 20 wherein the electrolyte used further comprises phosphoric acid.

22. A process for operating fuel cells comprising using as an electrolyte one or more phosphonic acids of the formula

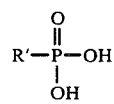

wherein R' is hydroxyalkyl, alkyl, phenyl, alkylphenyl, vinyl, haloalkyl, halophenyl and halomethylphenyl and oxidizing a gaseous fuel while maintaining said cell at a temperature from about 100° C. to about 250° C.

23. The process of claim 22 wherein said gaseous fuel is selected from the group consisting of gaseous saturated aliphatic hydrocarbons, carbon monoxide, hydrogen, methanol and mixtures thereof.

24. The process of claim 22 wherein said fuel is hydrogen and said oxidizer is oxygen.

* * * * *